May 19, 1964

D. L. KATZ 3,133,580

THREADED FASTENER HAVING RESILIENT ESCUTCHEON
ENCOMPASSING THE HEAD THEREOF

Filed Feb. 7, 1961

INVENTOR.
David L. Katz

BY

S. J. Rotondi & A. J. Dupont

United States Patent Office 3,133,580
Patented May 19, 1964

3,133,580
THREADED FASTENER HAVING RESILIENT ESCUTCHEON ENCOMPASSING THE HEAD THEREOF
David L. Katz, Longmeadow, Mass., assignor to the United States of America as represented by the Secretary of the Army
Filed Feb. 7, 1961, Ser. No. 87,724
1 Claim. (Cl. 151—41.73)
(Granted under Title 35, U.S. Code (1952), sec. 266)

The invention described herein may be manufactured and used by or for the Government for governmental purposes without the payment to me of any royalty thereon.

This invention relates to screw-threaded fasteners and washers for protecting the material into which the fasteners are screwed and for resisting the unloosening of the respective fasteners.

When screws are used in a component where it is important to protect the material around the screwhole from destruction by the screwhead, it is customary to use escutcheons or protective washers which provide a barrier between the head of the screw and the receiving recess in the component. But because of the metal-to-metal contact between the head of the screw and the protective washer, the screw has a tendency to unloosen when subjected to vibrational forces.

It is, therefore, an object of this invention to provide for screw-threaded fasteners, such as wood and machine screws, a washer which protects the material of an associated component from damage by the head of the fastener and which resists the unloosening of the fastener.

It is another object of this invention to provide, as an assembled unit, a screw-threaded fastener and a protective washer which resists the unloosening of the fastener.

The specific nature of the invention as well as other objects and advantages thereof will clearly appear from a description of a preferred embodiment as shown in the accompanying drawings in which.

Figure 1:
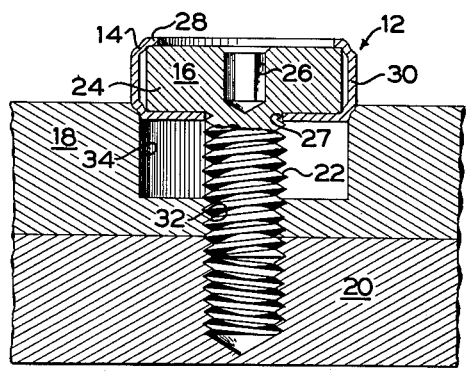
FIG. 1 is a cross-sectional view of a fastener assembly in which the fastener is of socket-head, cap-screw type and the assembly is partially tightened into a pair of components.
Figure 2:
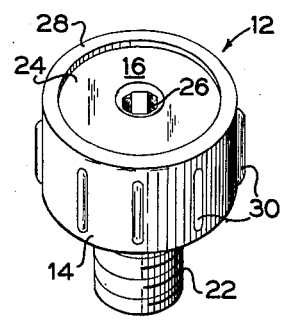
FIG. 2 is a perspective view of the fastener assembly shown in FIG. 1.

Shown in FIGS. 1 and 2 is an assembly 12 comprising an escutcheon 14 and a conventional screw-threaded fastener 16 of socket-head, cap-screw type for joining together a first component 18 which is softer than steel, such as wood, plastic or aluminum, and a second component 20. Fastener 16 is provided with a threaded portion 22 and a conventional head 24 of larger diameter. A socket recess 26 is centrally located in the top of head 24.

Escutcheon 14 is formed by press process to a cylindrical, cuplike configuration with an aperture 27 centrally located in the base thereof. Escutcheon 14 is designed to matingly and rotatingly receive head 24 with threaded portion 22 extending through aperture 27. The top edge of escutcheon 14 is rounded over the top of head 24 to form a lip 28 for retaining the escutcheon on the head. Provided around the cylindrical wall of escutcheon 14 is a plurality of elongated protrusions 30 of arcuate contour which are pressed outwardly therefrom and which are disposed parallel to the longitudinal axis of the escutcheon so as to be normal to the direction of rotation of fastener 16. Positioners 30 are substantially of U-configuration in cross-sections along both the long and the short axes and are resiliently compressible.

First component 18, which initially receives fastener 16, is provided with a bore 32 for matingly receiving threaded portion 22. Bore 32 is counterbored, as noted at 34, for receiving escutcheon 14. Counterbore 34 has a diameter similar to that of the outside diameter of escutcheon 14, not including protrusions 30. Consequently, when fastener 16 is screwed into components 18 and 20, escutcheon 14 is pressed by head 24 into counterbore 34 and, as the escutcheon enters thereinto, protrusions 30 compressively displace the material around the counterbore and are partially compressed, in turn, to press resiliently against the wall of the counterbore for frictional contact therewith. Thus, escutcheon 14 is held against rotational displacement, as fastener 16 is turned, and so is drawn translationally into counterbore 34. Thereby, the wall of counterbore 34 is protected from any damage which might be caused by the rotation of head 24 during displacement thereinto.

Once assembly 12 is tightened to fasten components 18 and 20 together, fastener 16 is restrained from unloosening because the compressive forces of the displaced material around counterbore 34 and the protrusions 30 frictionally hold escutcheon 14 against displacement. Consequently, fastener 16 is restrained from unloosening because of the contact of lip 28 with the top of head 24, which blocks the translational component of the unloosening movement.

When fastener 16 is to be removed for the disassembly of components 18 and 20, the unscrewing of the fastener transfers the translational component of movement thereof to escutcheon 14 through the contact of lip 28 by head 24, whereby, escutcheon 14 is pulled translationally from counterbore 34 leaving the wall thereof solid and firm and not mutilated by shredding which might make necessary a replacement of first component 18.

Figure 3:
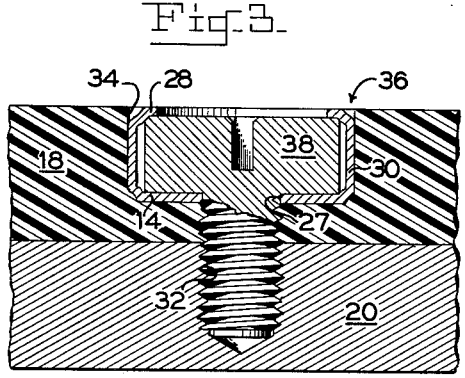
FIG. 3 is a view similar to FIG. 1 but showing an assembly in which the fastener is of pan-head, machine-screw type and the assembly is fully tightened into the pair of components.
Figure 4:
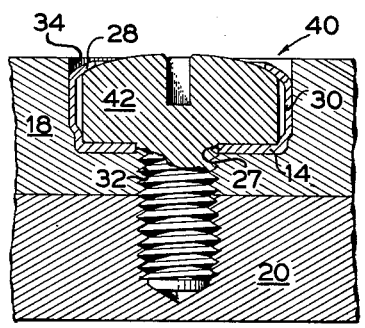
FIG. 4 is a view similar to FIG. 3 but showing an assembly in which the fastener is of fillister-head, machine-screw type.

Shown in FIG. 3 is an assembly 36 in which escutcheon 14 is assembled to a fastener 38 of the type of a pan-head machine screw and FIG. 4 shows an assembly 40 wherein the escutcheon is assembled to a fastener 42 of a fillister-head machine screw type.

Figure 5:
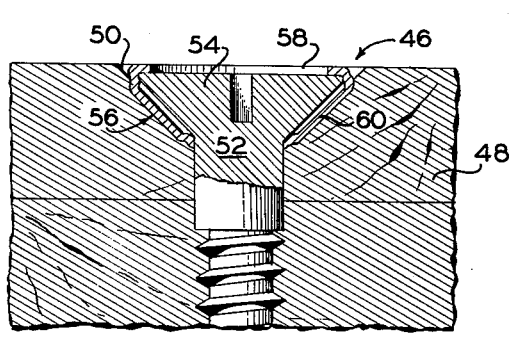
FIG. 5 is a view similar to FIG. 4 but showing an assembly in which the fastener is of wood-screw type.
Figure 6:
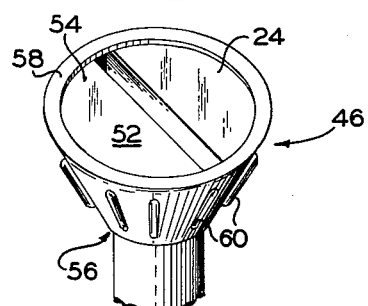
FIG. 6 is a perspective view of the assembly shown in FIG. 5.

In FIGS. 5 and 6, there is shown as assembly 46 which is used in conjunction with a wooden component 48 provided with a countersunk recess 50 and which is provided with a fastener 52 of conventional wood-screw type with a conical head 54. Assembled to head 54 is an escutcheon 56 formed by press process to a conical configuration for matingly and rotatingly receiving the head. The top of escutcheon 56 is bent over the top of head 54 to form an annular lip 58 for retaining the escutcheon thereon. Provided around escutcheon 56 is a plurality of elongated protrusions 60 of arcuate contour which are pressed outwardly therefrom.

When fastener 52 is tightened into component 48, escutcheon 56 is forced into contact with the wall of countersunk recess 50 to force protrusions 60 thereinto. The frictional gripping of the displaced material with the protrusions 60 retains escutcheon 56 in countersunk recess 50 and the contact of lip 58 with the top of head 54 resists the unloosening displacement of fastener 52.

From the foregoing, it is clearly apparent that there is provided herein a screw-threaded, fastener assembly which protects the associated component from injury caused by the rotation of the fastener head during installation and removal which leaves the wall of the receiving recess solid and firm and which resist unloosening of the fastener.

Although a particular embodiment of the invention has been described in detail herein, it is evident that many variations may be devised within the spirit and scope thereof and the following claims are intended to include such variations.

I claim:

A screw-threaded fastener assembly for joining a first and a second component, said assembly including a fastener provided with a head and a screw-threaded portion initially insertable through the first component, an escutcheon formed to matingly receive said head for rotation therein and having a circumferentially continuous body of cup-like configuration with a central aperture in the base thereof for receiving said screw threaded portion, said body closely engaging the under and side surfaces of said head, said escutcheon being receivable in a mating recess in the first component to form a barrier between said head and a wall of said recess when drawn by said screw-threaded portion thereinto, the top of said body having an integral circumferentially continuous lip which extends over the top of said head to retain said escutcheon thereon, and a plurality of elongated protrusions pressed outwardly from said body so as to be longitudinally disposed normal to the direction of rotation of said fastener, said protrusions being of arcuate configuration and substantially U-shaped in cross-section along both the long and the short axes of the elongated configuration and said protrusions being designed to compressively displace the material of the first component at the wall of the recess when drawn thereinto and to be resiliently compressible in turn to resiliently grip the wall of the recess for preventing displacement of said escutcheon therefrom.

References Cited in the file of this patent

UNITED STATES PATENTS

| | | |
|---|---|---|
| 659,068 | Ives | Oct. 2, 1900 |
| 1,756,186 | Fenton | Apr. 29, 1930 |